US 6,751,747 B2

(12) United States Patent
Li (10) Patent No.: US 6,751,747 B2
(45) Date of Patent: Jun. 15, 2004

(54) SYSTEM, DEVICE, AND METHOD FOR DETECTING AND RECOVERING FROM FAILURES IN A MULTICAST COMMUNICATION SYSTEM

(75) Inventor: Yunzhou Li, Lowell, MA (US)

(73) Assignee: Nortel Networks Limited (CA)

( * ) Notice: Subject to any disclaimer, the term of this patent is extended or adjusted under 35 U.S.C. 154(b) by 573 days.

(21) Appl. No.: 09/737,449

(22) Filed: Dec. 14, 2000

(65) Prior Publication Data

US 2001/0037472 A1 Nov. 1, 2001

Related U.S. Application Data

(60) Provisional application No. 60/201,117, filed on May 2, 2000.

(51) Int. Cl.[7] .................................................. G06F 11/00
(52) U.S. Cl. .............................. 714/4; 725/151; 713/163
(58) Field of Search ........................ 714/4; 713/163; 709/205, 207; 725/151, 95, 96, 97, 118

(56) References Cited

U.S. PATENT DOCUMENTS

| | | | | |
|---|---|---|---|---|
| 5,748,958 A | * | 5/1998 | Badovinatz et al. | 709/100 |
| 6,512,774 B1 | * | 1/2003 | Vepa et al. | 370/401 |
| 6,523,069 B1 | * | 2/2003 | Luczycki et al. | 709/249 |
| 6,529,882 B1 | * | 3/2003 | Park et al. | 705/51 |
| 6,532,233 B1 | * | 3/2003 | Momona et al. | 370/390 |
| 6,539,000 B1 | * | 3/2003 | Murai et al. | 370/260 |
| 2002/0165977 A1 | * | 11/2002 | Novaes | 709/238 |

OTHER PUBLICATIONS

W. Fenner, "Internet Group Management Protocol, Version 2," Xerox PARC, Nov. 1997.
Cain, Deering, Kouvelas, Thyuagarajan, "Internet Group Management Protocol, Version 3," <draft–ietf–idmr–igmp–v3–04.txt>, Jun. 2000.

* cited by examiner

*Primary Examiner*—Robert Beausoliel
*Assistant Examiner*—Christopher McCarthy
(74) *Attorney, Agent, or Firm*—Steubing McGuinness & Manaras LLP (57) ABSTRACT

A system, device, and method for detecting and recovering from failures in a multicast communication system involves joining a multicast group over a primary interface, monitoring for multicast group information received over the primary interface, and determining that there is a multicast group failure if no multicast group information is received over the primary interface for a predetermined amount of time. Recovering from such a failure typically involves joining the multicast group over a backup interface in order to continue receiving multicast group information over the backup interface. A relay/proxy device may join the multicast group on behalf of a multicast host and forward multicast group information to the multicast host.

56 Claims, 6 Drawing Sheets

SYSTEM, DEVICE, AND METHOD FOR DETECTING AND RECOVERING FROM FAILURES IN A MULTICAST COMMUNICATION SYSTEM

PRIORITY

This application claims priority from provisional U.S. patent application serial No. 60/201,117, filed May 2, 2000, entitled "SYSTEM, DEVICE, AND METHOD FOR PROVIDING REDUNDANCY FOR STREAMS IN A MULTICAST NETWORK", the disclosure of which is incorporated herein, in its entirety, by reference.

FIELD OF THE INVENTION

The present invention relates generally to communication systems, and more particularly to providing redundancy for multicast streams in a multicast communication system.

BACKGROUND OF THE INVENTION

In today's information age, communication networks are often used for transporting information from an information provider to one or more information consumers.

One technique for transporting information from an information provider to a group of information consumers over the communication network is known as "multicasting." Multicasting is a well-know method of transmitting information to selected groups of users across a network, such as the Internet. For example, the transmission of an e-mail message to a group of users, each user being listed on a mailing list, may use multicasting principles. Video conferencing and teleconferencing may also use multicasting principles and, accordingly, are often referred to as "multi-conferencing." Multicasting allows the information provider (referred to hereinafter as a "multicast source") to transmit a single unit of multicast information (referred to hereinafter as a "multicast packet") simultaneously to all information consumers (referred to hereinafter individually as a "multicast host" and collectively as "multicast hosts") in the multicast group, specifically by addressing the multicast packet to the multicast group using a multicast address. The multicast hosts monitor the communication network for multicast packets addressed to the multicast group.

In order to distribute multicast packets from a particular multicast source S to the multicast hosts for a particular multicast group G, the multicast packet is routed through the communication network by a number of routers. The communication network may include multiple routing domains, and therefore the multicast packet may traverse multiple routing domains. Each router runs various routing protocols to determine, among other things, a "next hop" for each packet based upon address information in the packets. Such routing information is used to establish a multicast distribution tree, and is maintained by each router in one or more routing tables (often referred to as a "routing information base"). Due to the increased demand for applications utilizing multicasting principles, protocols such as the Internet Group Multicast Protocol ("IGMP") have been developed and refined to support multicasting over a Transmission Control Protocol/Internet Protocol ("TCP/IP") network, such as the Internet. The new protocols, such as IGMP, allow users to easily create and join multicasting session ("multicasts").

Typically, multicast networks are configured to communicate provider information from multiple providers to multicast clients over a single primary communications link. To provide redundancy, multicast networks are also connected to the multicast clients via a backup link as well so that, in the event of a failure in the primary link, the network will switch-over to the backup link to communicate the provider information.

One problem with the redundancy feature in the typical multicast network is that there is no provision made for a failure in a network provider which is unrelated to a link failure but which terminates the communication of provider information to the multicast clients. This can happen, for example, from the failure of one of the routers used to distribute multicast packets containing provider information to the multicast hosts. Because the network fails to detect a link failure, the switch-over to the backup link is not performed, resulting in the provider information not being communicated to the multicast clients.

Thus, a technique for providing redundancy in a multicast network in the event of a failure other than a link failure is needed.

SUMMARY OF THE INVENTION

In accordance with one aspect of the present invention, a networking device joins a multicast group over a primary interface. Joining the multicast group over the primary interface enables the networking device to receive multicast group information (i.e., a multicast stream) over the primary interface. The networking device monitors for multicast group information received over the primary interface. The networking device determines that there is a failure if no multicast group information is received over the primary interface for a predetermined amount of time. Upon detecting such a failure, the networking device typically joins the multicast group over a backup interface in order to continue receiving the multicast group information over the backup interface.

According to another aspect of the invention, the networking device receives a request from a multicast host to become a member of a multicast group and joins the multicast group over the primary interface on behalf of the multicast host. Upon determining that no information from the multicast group is received for a period of time over the primary interface, the networking device joins the multicast group over the backup interface on behalf of the multicast host to receive the information. The networking device remains joined to the multicast group over the primary interface on behalf of the multicast host and leaves the backup interface upon determining that the information is once again being received over the primary interface.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

In an embodiment of the present invention, a networking device joins a multicast group over a primary interface. Joining the multicast group over the primary interface enables the networking device to receive a multicast group information (i.e., a multicast stream) over the primary interface. The networking device monitors for multicast group information received over the primary interface. The networking device determines that there is a failure if no multicast group information is received over the primary interface for a predetermined amount of time. Upon detecting such a failure, the networking device typically joins the multicast group over a backup interface in order to continue receiving the multicast group information over the backup interface.

Figure 1:
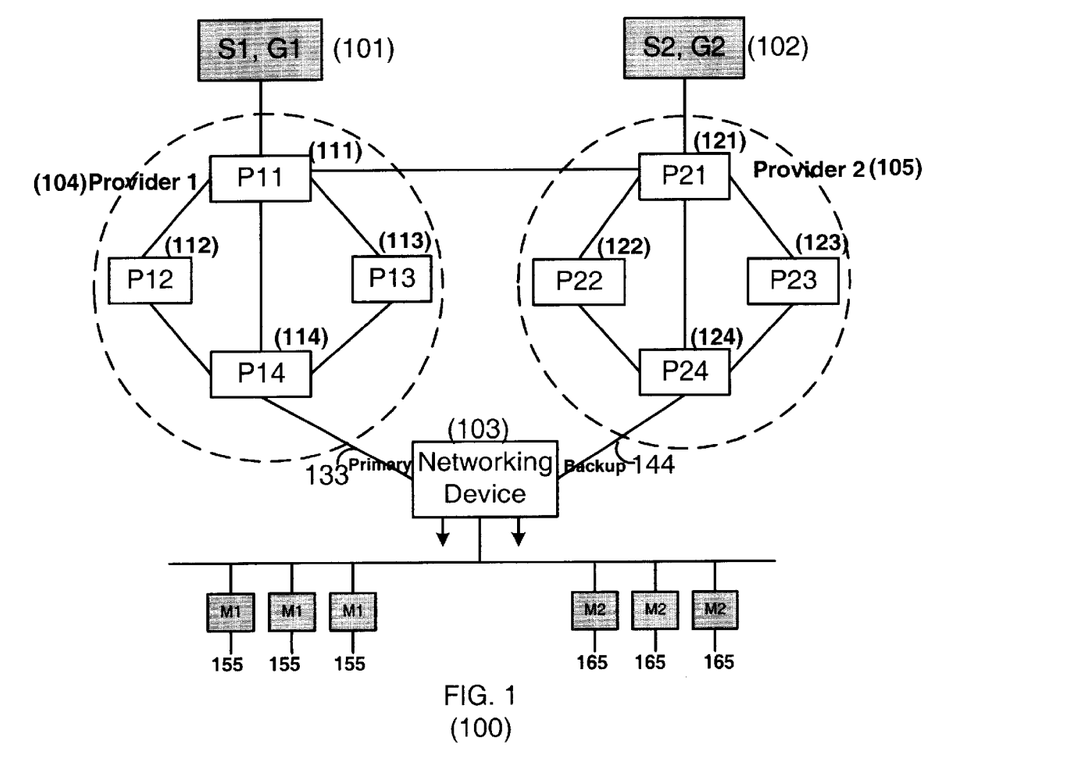
FIG. 1 is a network diagram showing an exemplary multicast communication network including a networking device in accordance with an embodiment of the present invention.

FIG. 1 shows an exemplary multicast communication network 100 having two providers for multicasting multicast group information. For this example, Provider 1 (104) is considered to be the primary provider, while Provider 2 (105) is considered to be the backup provider. Provider 1 (104) includes four interconnected routers, namely P11 (111), P12 (112), P13 (113), and P14 (114). Similarly, Provider 2 (105) also includes four interconnected routers, namely P21 (121), P22 (122), P23 (123), and P24 (124).

In this example, there are two multicast streams represented by a source/group pair, namely (S1,G1) (101) and (S2,G2) (102) which contain multicast group information. Specifically, stream (S1,G1) (101) contains Group 1 information and (S2,G2) (102) contains Group 2 information. In this example, both streams are available to both providers. Specifically, P11 (111) forwards stream (S1,G1) (101) to P21 (121), and P21 (121) forwards the stream (S2,G2) (102) to P11 (111). Both providers make forwarding decisions for both streams.

In a typical embodiment under normal operating conditions, networking device 103 is operably coupled to primary link 133 by a primary interface (not shown) and to backup link 144 by a backup interface (not shown). Networking device 103 joins both streams over the primary interface. Thus, Provider 1 (104), the primary provider, forwards both streams to networking device 103 over the primary link 133 and Provider 2 (105), the backup provider, forwards neither stream to networking device 103 over the backup link 144. Networking device 103 then forwards the streams of multicast group information to the corresponding multicast hosts M1 (155) and M2 (165) over a host interface (not shown). In this example, networking device 103 is preferably an Internet Group Management Protocol Relay (IGMP-R) device that joins multicast groups on behalf of the multicast hosts M1 (155) and M2 (165) and forwards multicast information to the multicast hosts M1 (155) and M2 (165).

The networking device 103 maintains a forwarding state for each stream of multicast group information. Each forwarding state indicates, among other things, whether to join the corresponding stream over the primary interface or the backup interface. In a typical embodiment under normal operating conditions, the forwarding states for both streams are configured such that the networking device 103 joins both streams of mulitcast group information over the primary interface and forwards them to multicast hosts M1 (155) and M2 is (165) over the host interface.

Under certain circumstances, the primary link 133 may fail. Upon detecting such a failure of the primary link 133, the networking device 103 signals Provider 2 (105) to forward the streams of multicast group information over the backup link 144, and reconfigures the forwarding states for both streams such that networking device 103 joins both streams over the backup interface. For convenience, this switch from the primary link 133 to the backup link 144 by networking device 103 is referred to hereinafter as "fail-over."

Unfortunately, Provider 1 (104) may stop forwarding the streams to networking device 103 over primary link 133, even when there is no failure of the primary link 133. This can happen, for example, from a failure of some other component within Provider 1 (104), such as P14 (114). Because the networking device 103 does not detect a link failure, the networking device 103 does not perform a fail-over, and therefore remains configured to join both streams over the primary interface. As a result, no multicast group information is received by networking device 103, and consequently no mulitcast group information is forwarded by the networking device 103 to multicast hosts M1 (155) and M2 (165).

Thus, in an embodiment of the invention, the networking device 103 monitors the primary interface for multicast group information after joining the multicast group over the primary interface. As long as the multicast group is operational, the networking device 103 is expected to receive multicast group information regularly over the primary interface, with no gaps lasting more than a predetermined amount of time (typically 16 seconds). The networking device 103 therefore determines that there is a failure of the multicast group if no multicast group information is received over the primary interface for the predetermined amount of time. By monitoring for multicast group information rather than monitoring the status of the primary link 133, the networking device 103 is better able to detect a failure of the multicast group.

The networking device 103 typically uses a timer in order to determine if no multicast group information is received over the primary interface for the predetermined amount of time. The timer is typically configured to expire after the predetermined amount of time. The networking device 103 typically starts or re-starts the timer whenever it receives multicast group information over the primary interface. Thus, the timer does not expire as long as the networking device 103 continues receiving multicast group information over the primary interface. The timer does expire, however, if the networking device 103 fails to receive multicast group information over the primary interface for the predetermined amount of time. Thus, the networking device 103 monitors the timer, and determines that the multicast group has failed upon determining that the timer expired.

Upon detecting a failure of the multicast group, the networking device 103 typically joins the multicast group over the backup interface in order to continue receiving multicast group information over the backup interface. The networking device 103 typically remains joined to the multicast group over the primary interface, and continues monitoring for multicast group information received over the primary interface. When the networking device 103 receives multicast group information over the primary interface, the networking device 103 typically leaves the multicast group over the backup interface.

Figure 2:
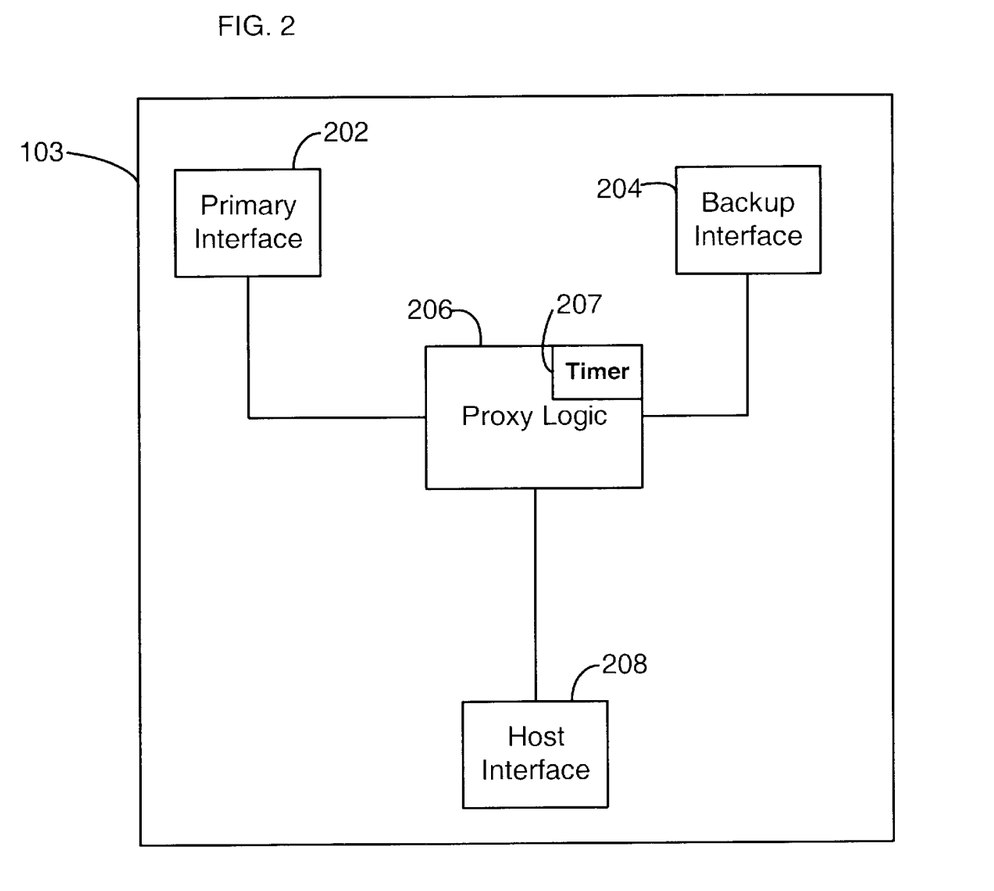
FIG. 2 is a block diagram showing the relevant logic blocks of the networking device shown in FIG. 1.

FIG. 2 is a block diagram showing the relevant logic blocks of an exemplary networking device 103. Among other things, the networking device 103 includes a primary interface 202 for coupling to the primary link 133, a backup interface 204 for coupling to the backup link 144, proxy logic 206 for joining multicast groups on behalf of the multicast hosts M1 (155) and M2 (165) and forwarding multicast group information to the multicast hosts M1 (155) and M2 (165), a timer 207, and a host interface 208 for communicating with the multicast hosts M1 (155) and M2 (165). The proxy logic 206 typically determines multicast group memberships for the multicast hosts M1 (155) and M2 (165) using IGMP over the host interface 208 (described in more detail below). The proxy logic 206 joins a multicast group over the primary interface 202, and monitors for multicast group information received over the primary interface 202. If no multicast group information is received over the primary interface 202 for the predetermined amount of time, then the proxy logic 206 determines that there is a failure of the multicast group, and joins the multicast group over the backup interface 204. The proxy logic 206 uses the timer 207 for determining if no multicast group information is received over the primary interface 202 for the predetermined amount of time. The timer 207 is typically either a count-up timer, which starts at zero and expires when it reaches a predetermined maximum value, or a count-down timer, which starts at the predetermined maximum value and expires when it reaches zero. The proxy logic 206 typically remains joined to the multicast group over the primary interface 202, and continues monitoring for multicast group information received over the primary interface 202. When the proxy logic 206 determines that multicast group information is being over the primary interface 202, the proxy logic 206 typically leaves the multicast group over the backup interface 204.

Figure 3:
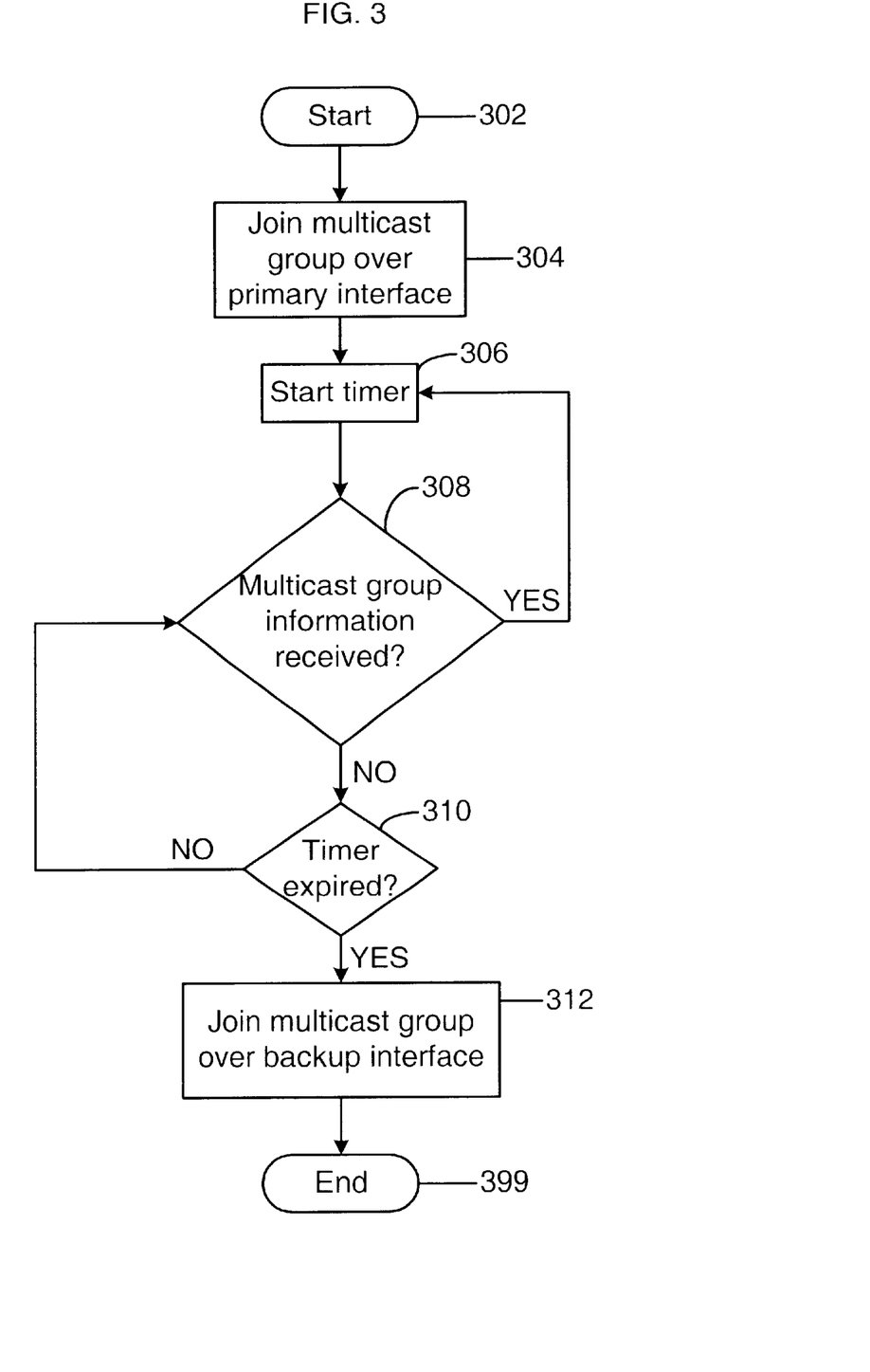
FIG. 3 is a logic flow diagram showing exemplary logic for providing redundancy for a multicast group in accordance with an embodiment of the present invention.

FIG. 3 is a logic flow diagram showing exemplary proxy logic 206 for detecting and recovering from a multicast group failure. Beginning at step 302, proxy logic 206 joins a multicast group (i.e., chooses to receive a multicast stream) over primary interface 202, which is coupled to primary link 133, in step 304. Upon joining the multicast group, the proxy logic 206 starts timer 207, in step 306. The proxy logic 206 then monitors for multicast group information received over the primary interface, in step 308, and uses the timer 207 to determine if no multicast group information is received over the primary interface 202 for a predetermined amount of time, in step 310. If no multicast group information is received over primary interface 202 for the predetermined amount of time (YES in step 310), the proxy logic 206 joins the multicast group over backup interface 204, in step 312. Conversely, if multicast group information is received over the primary interface 202 within the predetermined amount of time (YES in step 308), the proxy logic 206 resets timer 207 and waits for additional multicast group information.

In the illustrative embodiment shown in FIG. 1, the networking device 103 is an IGMP relay device that joins multicast groups on behalf of the multicast hosts M1 (155) and M2 (165) and forwards multicast group information to the multicast hosts M1 (155) and M2 (165). The networking device 103 typically uses IGMP to determine the multicast group memberships of the multicast hosts M1 (155) and M2 (165) over the host interface 208 and also uses IGMP to join and leave multicast groups over the primary interface 202 and the backup interface 204. In order to determine the multicast group memberships of the multicast hosts M1 (155) and M2 (165) over the host interface 208, the networking device 103 sends IGMP query messages to the multicast hosts M1 (155) and M2 (165) over the host interface 208 and receives IGMP report messages from the multicast hosts M1 (155) and M2 (165) over the host interface 208 indicating the multicast group memberships of the multicast hosts M1 (155) and M2 (165). In order to join and leave multicast groups over the primary interface 202, the networking device 103 receives IGMP query messages over the primary interface 202 and sends IGMP report messages over the primary interface 202 indicating multicast group memberships maintained by the networking device 103 over the primary interface 202. In order to join and leave multicast groups over the backup interface 204, the networking device 103 receives IGMP query messages over the backup interface 204 and sends IGMP report messages over the backup interface 204 indicating multicast group memberships maintained by the networking device 103 over the backup interface 204. The networking device 103 typically remains joined to a particular multicast group over the primary interface 202 and/or the backup interface 204 as long as at least one of the multicast hosts M1 (155) and M2 (165) is a member of the multicast group and leaves the multicast group when none of the multicast hosts M1 (155) and M2 (165) is a member of the multicast group.

Figure 4:
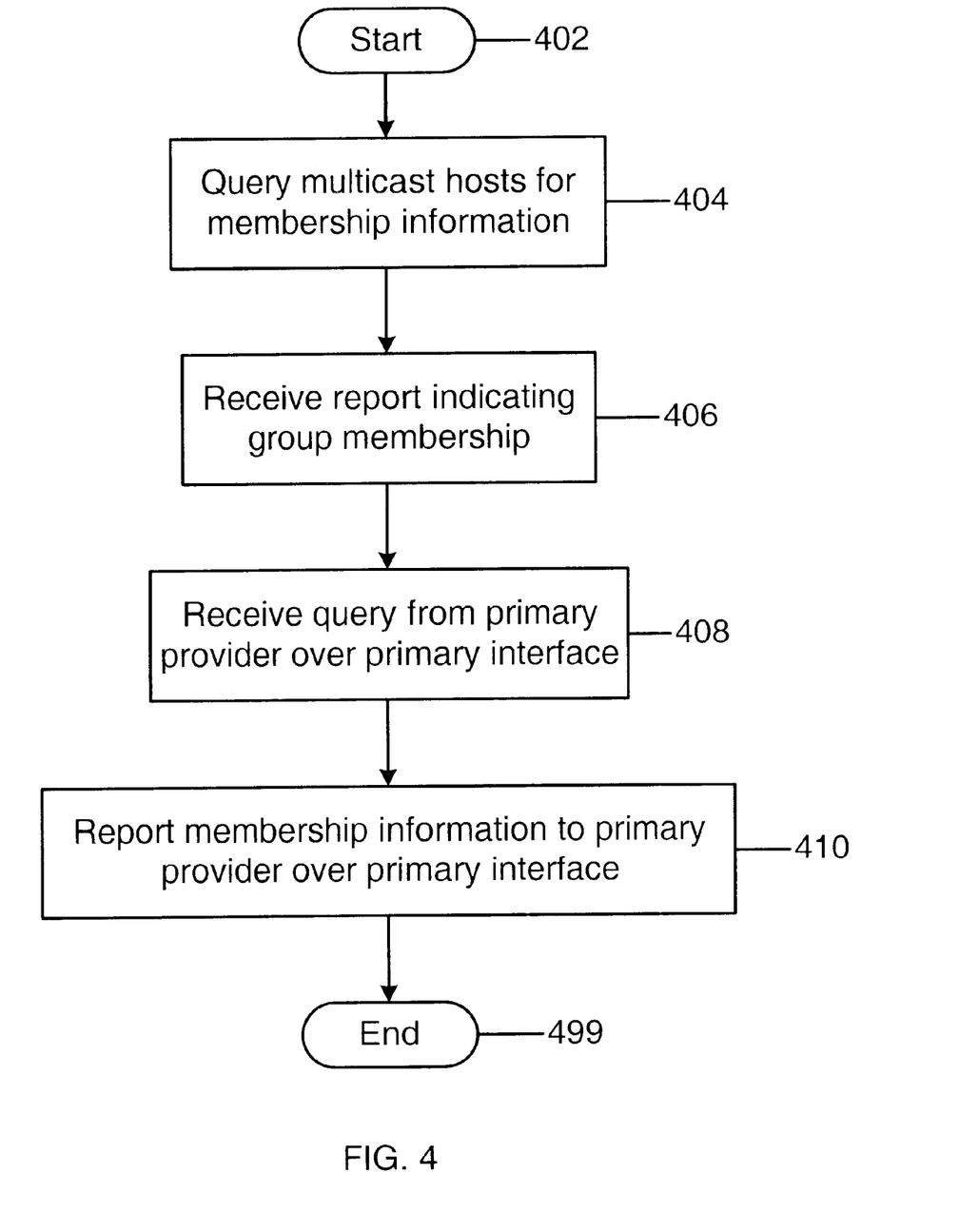
FIG. 4 is a logic flow diagram showing in further detail the exemplary logic for joining a multicast group over the primary interface as shown in FIG. 3.

FIG. 4 is a logic flow diagram showing exemplary proxy logic 206 for joining the multicast group over the primary interface 202, as shown in step 304 of FIG. 3. Beginning at step 402, proxy logic 206 sends a query message to multicast hosts M1 (155) or M2 (165) over host interface 208, the query message requesting membership information in a multicast group, in step 404. In step 406, the proxy logic 206 receives a report message from the multicast hosts M1 (155) or M2 (165) in response to the query message over the host interface 208, the report message indicating the multicast group in which the multicast hosts are members. Continuing to step 408, proxy logic 206 receives a query message from the primary provider 104 over the primary interface 202 requesting mulitcast group membership information and, in step 410, proxy logic 206 sends a report message over primary interface 202 indicating membership in a mulitcast group on behalf of the multicast hosts M1 (155) or M2 (165).

Figure 5:
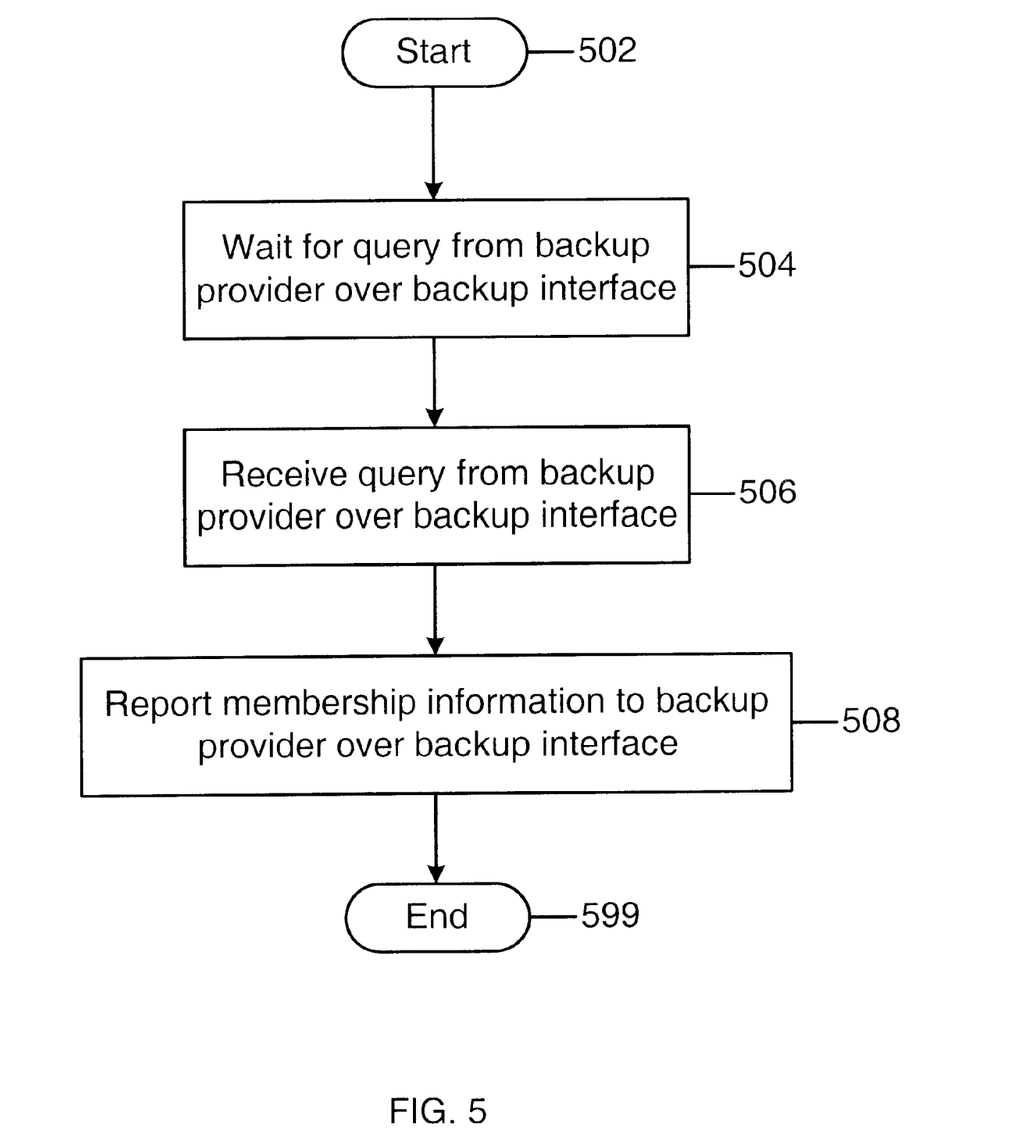
FIG. 5 is a logic flow diagram showing in further detail the exemplary logic for joining the multicast group over the backup interface as shown in FIG. 3.

FIG. 5 is a logic flow diagram showing exemplary logic for joining the multicast group over the backup interface 204 after determining that no multicast group information is received over the primary interface 202 for the predetermined amount of time, as shown in step 312 of FIG. 3. Beginning at step 502, and upon determining that no multicast group information is received over the primary interface 202 for the predetermined amount of time, the proxy logic 206 waits for a query from the backup provider 105 over the backup interface 204, in step 504. Upon receiving the query message from the backup provider 105 over the backup interface 204, in step 506, the proxy logic 206 sends a report message over backup interface 204 indicating membership in the mulitcast group, in step 508.

Proxy logic 206 typically remains joined to the multicast group over the primary interface 202 after it joins the multicast group over the backup interface 204. The proxy logic continues monitoring for multicast group information received over the primary interface 202. Once proxy logic 206 determines that mulitcast group information is once again being received over the primary interface 202, the proxy logic 206 leaves the multicast group over the backup interface 204.

Figure 6:
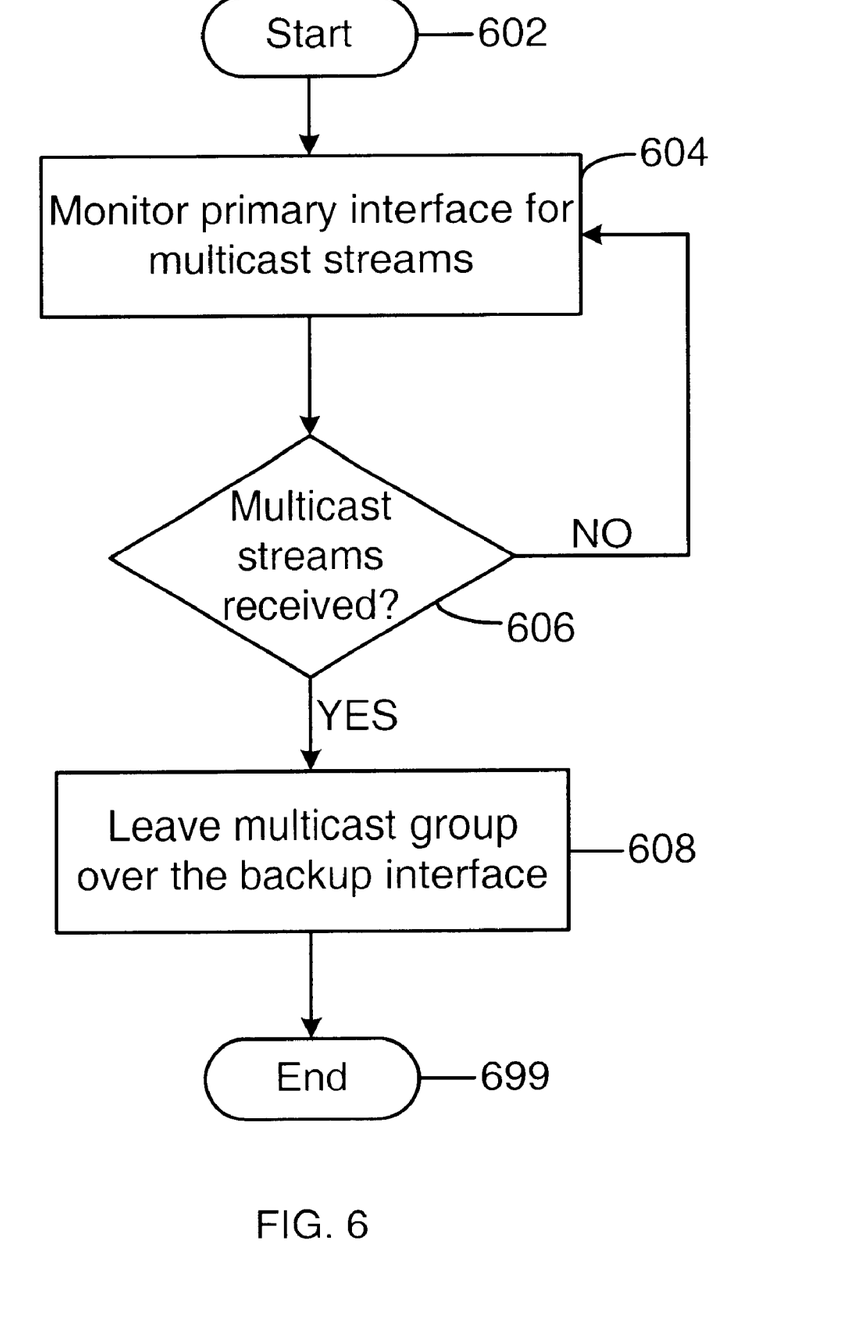
FIG. 6 is a logic flow diagram showing exemplary logic for leaving the backup interface and rejoining the primary interface in accordance with an embodiment of the present invention.

FIG. 6 is a logic flow diagram showing exemplary proxy logic 206 for leaving the multicast group over the backup interface 204 upon determining that multicast group information is once again being received over the primary interface 202. Beginning at step 602, proxy logic 206 monitors primary interface 202 to determine if multicast group information is being received, in step 604. If no multicast group information is being received over the primary interface 202 (NO in step 606), the proxy logic 206 continues monitoring the primary interface 202, in step 604. If multicast group information is being received over the primary interface 202 (YES in step 606), the proxy logic 206 leaves the multicast group over the backup interface 204, in step 608, particularly ceasing to report the multicast group membership in report messages sent to the backup provider 205 over the backup interface 204. As a result, the backup provider stops forwarding the multicast group streams to the proxy logic 206 over the backup interface.

In this example, the query messages are preferably IGMP query messages and the report messages are preferably IGMP report messages.

In the embodiments described herein, the networking device 103 monitors for multicast group information received over the primary interface 202 in order to detect a multicast group failure, and performs a fail-over upon detecting such a failure. However, the present invention is in no way limited to performing a fail-over upon detecting a failure. The networking device 103 may take another action upon detecting the failure in lieu of, or in addition to, performing a fail-over. The networking device 103 may utilize the fail-over scheme described herein or another fail-over scheme upon detecting the failure.

Although various aspects of the present invention are discussed with reference to an IGMP relay scheme, in which the networking device 103 is an IGMP relay device that joins multicast groups on behalf of the multicast hosts M1 (155) and M2 (165) and forwards multicast group information to the multicast hosts M1 (155) and M2 (165), the present invention is in no way limited to detecting and recovering from multicast failures in an IGMP relay environment.

Although FIG. 1 shows the networking device 103 coupled to two different providers, the present invention is in no way limited to any particular number of providers.

Although IGMP is preferably used by the networking device 103 for determining multicast group memberships for the multicast hosts M1 (155) and M2 (165) and for joining and leaving multicast groups over the primary interface 202 and/or the backup interface 204, the present invention is in no way limited to IGMP or to any other multicast group management protocol.

It should be noted that the networking device 103 is typically capable of supporting multiple multicast group memberships. Each multicast group membership is associated with a particular primary interface and backup interface. The primary and backup interfaces do not have to be the same for all multicast group memberships. The proxy logic 206 monitors each multicast group membership for multicast group information received over its corresponding primary interface, and typically maintains a separate timer for each multicast group membership in order to determine if no multicast group information has been received for a particular multicast group membership over the corresponding primary interface for the predetermined amount of time.

It should be noted that the terms such as "networking device" and "router" are used herein to describe various communication devices that may be used in a communication system, and should not be construed to limit the present invention to any particular communication device type. Thus, a communication device may include, without limitation, a bridge, router, bridge-router (brouter), switch, node, or other communication device.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the proxy logic 206 is implemented as a set of computer program instructions that is converted into a computer executable form, stored as such in a computer readable medium, and executed by a microprocessor within the proxy logic 206 under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies, networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A method for detecting a failure in a multicast communication network, the method comprising:

joining a multicast group over a primary interface; and determining that no multicast group information is received over the primary interface for a predetermined amount of time including maintaining for the multicast group a timer that expires when no multicast group information is received over the primary interface for the predetermined amount of time;

determining that the time expired; and resetting the timer when multicast group information is received over the primary interface.

2. The method of claim 1, wherein joining the multicast group over the primary interface comprises:

receiving a request for multicast group membership information over the primary interface; and sending a response to the request for multicast group membership information over the primary interface, the response indicating membership in the multicast group.

3. The method of claim 2, wherein the request for multicast group membership information comprises an IGMP query message, the wherein the response to the request for multicast group membership information comprises an IGMP report message.

4. The method of claim 1, wherein the predetermined amount of time is 16 seconds.

5. The method of claim 1, wherein determining that no multicast group information is received over the primary interface for a predetermined amount of time comprises:

monitoring for multicast group information received over the primary interface.

6. The method of claim 1, further comprising:

recovering from the failure.

7. The method of claim 6, wherein recovering from the failure comprises:

joining the multicast group over a backup interface.

8. The method of claim 7, wherein joining the multicast group over the backup interface comprises:

receiving a request for multicast group membership information over the backup interface; and sending a response the request for multicast group membership information over the backup interface, the response indicating membership in the multicast group.

9. The method of claim 8, wherein the request for multicast group membership information comprises an IGMP query message, and wherein the response to the request for multicast group membership information comprises an IGMP report message.

10. The method of claim 1, wherein joining the multicast group over the primary interface comprises:

joining the multicast group over the primary interface on behalf of a multicast host.

11. The method of claim 10, wherein joining the multicast group over the primary interface on behalf of a multicast host comprises:

sending a request for multicast group membership information to the multicast host over a host interface; and receiving a response to the request for multicast group membership information from the multicast host over the host interface, the response indicating membership in the multicast group.

12. The method of claim 11, wherein the request for multicast group membership information comprises an IGMP query message, and wherein the response to the request for multicast membership information comprises an IGMP report message.

13. A method for detecting a failure in a multicast communication network, the method comprising;

joining a multicast group over a primary interface; and determining that no multicast group information is received over the primary interface for a predetermined amount of time including maintaining for the multicast group a timer that expires when no multicast group information is received over the primary interface for the predetermined amount of time;

determining that the time expired; and wherein the timer is one of:

a count-up timer and a count-down timer.

14. A method for detecting a failure in a multicast communication network, the method comprising:

joining a multicast group over a primary interface; and determining that no multicast group information is received over the primary interface for a predetermined amount of time;

recovering from the failure including joining the multicast group over a backup interface;

remaining joined to the multicast group over the primary interface after joining the multicast group over the backup interface;

determining that multicast group information is being received over the primary interface; and leaving the multicast group over the backup interface.

15. The method of claim 14, wherein remaining joined to the multicast group over the primary interface after joining the multicast group over the backup interface comprises:

receiving a request for multicast group membership information over the primary interface; and sending a response to the request for multicast group membership information over the primary interface, the response indicating membership in the multicast group.

16. The method of claim 14, wherein determining that multicast group information is being received over the primary interface comprises:

monitoring for multicast group information received over the primary interface.

17. The method of claim 14, wherein leaving the multicast group over the backup interface comprises:

receiving a request for multicast group membership information over the backup interface; and sending a response to the request for multicast group membership information over the backup interface, the response without an indication of membership in the multicast group.

18. The method of claim 17, wherein the request for multicast group membership information comprises an IGMP query message, and wherein the response to the request for multicast group membership information comprises an IGMP report message.

19. An apparatus for detecting a failure in a multicast communication network, the apparatus comprising:

a primary interface for coupling to a first multicast network; and proxy logic operably coupled to join a multicast group over the primary interface and determine that no multicast group information is received over the primary interface for a predetermined amount of time; wherein the proxy logic is operably coupled to maintain for the multicast group a timer that expires when no multicast group information is received over the primary interface for the predetermined amount of time and determine that the timer expired in order to determine that no multicast group information is received over the primary interface for a predetermined amount of time and the proxy logic is operably coupled to reset the time when multicast group information is received over the primary interface.

20. The apparatus of claim 19, wherein the proxy logic is operably coupled to receive a request for multicast group membership information over the primary interface and send a response to the request for multicast group membership information over the primary interface indicating membership in the multicast group in order to join the multicast group over the primary interface.

21. The apparatus of claim 20, wherein the request for multicast group membership information comprises an IGMP query message, and wherein the response to the request for multicast group membership information comprises an IGMP report message.

22. The apparatus of claim 19, wherein the predetermined amount of time is 16 seconds.

23. The apparatus of claim 19, wherein the proxy logic is operably coupled to monitor for multicast group information received over the primary interface in order to determine that no multicast group information is received over the primary interface for a predetermined amount of time.

24. The apparatus of claim 19, wherein the proxy logic is operably coupled to recover from the failure.

25. The apparatus of claim 24, further comprising a backup interface, wherein the proxy logic is operably coupled to join the multicast group over the backup interface in order to recover from the failure.

26. The apparatus of claim 25, wherein the proxy logic is operably coupled to receive a request for multicast group membership information over the backup interface and send a response to the request for multicast group membership information over the backup interface indicating membership in the multicast group in order to join the multicast group over the backup interface.

27. The apparatus of claim 26, wherein the request for multicast group membership information comprises an IGMP query message, and wherein the response to the request for multicast group membership information comprises an IGMP report message.

28. The apparatus of claim 19, wherein the proxy logic is operably coupled to join the multicast group over the primary interface on behalf of a multicast host.

29. The apparatus of claim 28, further comprising a host interface, wherein the proxy logic is operably coupled to send a request for multicast group membership information to the multicast host over the host interface and receive a response to the request for multicast group membership information from the multicast host over the host interface indicating membership in the multicast group in order to join the multicast group over the primary interface on behalf of a multicast host.

30. The apparatus of claim 29, wherein the request for multicast group membership information comprises an IGMP query message, and wherein the response to the request for multicast group membership information comprises an IGMP report message.

31. An apparatus for detecting a failure in a multicast communication network, the apparatus comprising:

a primary interface for coupling to a first multicast network; and proxy logic operably coupled to join a multicast group over the primary interface and determine that no multicast group information is received over the primary interface for a predetermined amount of time; wherein the proxy logic is operably coupled to maintain for the multicast group a timer that expires when no multicast group information is received over the primary interface for the predetermined amount of time and determine that the timer expired in order to determine that no multicast group information is received over the primary interface for a predetermined amount of time; and wherein the timer is one of:

a count-up timer; and a count-down timer.

32. An apparatus for detecting a failure in a multicast communication network, the apparatus comprising:

a primary interface for coupling to a first multicast network; and proxy logic operably coupled to join a multicast group over the primary interface and determine that no multicast group information is received over the primary interface for a predetermined amount of time; wherein the proxy logic is operably coupled to maintain for the multicast group a timer that expires when no multicast group information is received over the primary interface for the predetermined amount of time and determine that the timer expired in order to determine that no multicast group information is received over the primary interface for a predetermined amount of time; and wherein the proxy logic is operably coupled to recover from the failure, to join the multicast group over the backup interface in order to recover from the failure, and to remain joined to the multicast group over the primary interface after joining the multicast group over the backup interface and leave the multicast group over the backup interface upon determining that multicast group information is being received over the primary interface.

33. The apparatus of claim 32, wherein the proxy logic is operably coupled to receive a request for multicast group membership information over the primary interface and send a response to the request for multicast group membership information over the primary interface indicating membership in the multicast group in order to remain joined to the multicast group over the primary interface after joining the multicast group over the backup interface.

34. The apparatus of claim 32, wherein the proxy logic is operably coupled to monitor for multicast group information received over the primary interface in order to determine that multicast group information is being received over the primary interface.

35. The apparatus of claim 32, wherein the proxy logic is operably coupled to receive a request for multicast group membership information over the backup interface and send a response to the request for multicast group membership information over the backup interface without an indication of membership in the multicast group in order to leave the multicast group over the backup interface.

36. The apparatus of claim 35, wherein the request for multicast group membership information comprises an IGMP query message, and wherein the response to the request for multicast group membership information comprises an IGAMP report message.

37. A computer program product for controlling a computer system to detect a failure in a multicast communication network, the computer program comprising:
proxy logic programmed to join a multicast group over a primary interface and determine that no multicast group information is received over the primary interface for a predetermined amount of time; wherein the proxy logic is programmed to maintain for the multicast group a timer that expires when no multicast group information is received over the primary interface for the predetermined amount of time and determine that the timer expired in order to determine that no multicast group information is received over the primary interface for a predetermined amount of time and to reset the timer when multicast group information is received over the primary interface.

38. The computer program product of claim 37, wherein the proxy logic is programmed to receive a request for multicast group membership information over the primary interface and send a response to the request for multicast group membership information over the primary interface indicating membership in the multicast group in order to join the multicast group over the primary interface.

39. The computer program product of claim 38, wherein the request for the multicast group membership information comprises an IGMP query message, and wherein the response to the request for multicast group membership information comprises an IGMP report message.

40. The computer program product of claim 37, wherein the predetermined amount of time is 16 seconds.

41. The computer program product of claim 37, wherein the proxy logic is programmed to monitor for multicast group information received over the primary interface in order to determine that no multicast group information is received over the primary interface for a predetermined amount of time.

42. The computer program product of claim 37, wherein the proxy logic is programmed to recover from the failure.

43. The computer program product of claim 42, wherein the proxy logic is programmed to join the multicast group over a backup interface in order to recover from the failure.

44. The computer program product of claim 43, wherein the proxy logic is programmed to receive a request for multicast group membership information over the backup interface and send a response to the request for multicast group membership information over the backup interface indicating membership in the multicast group in order to join the multicast group over the backup interface.

45. The computer program product of claim 44, wherein the request for multicast group membership information comprises an IGMP query message, and wherein the response to the request for multicast group membership information comprises an IGMP report message.

46. The computer program product of claim 37, wherein the proxy logic is programmed to join the multicast group over the primary interface on behalf of a multicast host.

47. The computer program product of claim 46, wherein the proxy logic is programmed to send a request for multicast group membership information to the multicast host over a host interface and receive a response to the request for multicast group membership information from the multicast host over the host interface indicating membership in the multicast group in order to join the multicast group over the primary interface on behalf of a multicast host.

48. The computer program product of claim 47, wherein the request for multicast group membership information comprises an IGMP query message, and wherein the response to the request for multicast group membership information comprises an IGMP report message.

49. A computer program product for controlling a computer system to detect a failure in a multicast communication network, the computer program comprising:
proxy logic programmed to join a multicast group over a primary interface and determine that no multicast group information is received over the primary interface for a predetermined amount of time; wherein the proxy logic is programmed to maintain for the multicast group a timer that expires when no multicast group information is received over the primary interface for the predetermined amount of time and determine that the timer expired in order to determine that no multicast group information is received over the primary interface for a predetermined amount of time and wherein the timer is one of:
a count-up timer,
a count-down timer.

50. A computer program product for controlling a computer system to detect a failure in a multicast communication network, the computer program comprising:
proxy logic programmed to join a multicast group over a primary interface and determine that no multicast group information is received over the primary interface for a predetermined amount of time wherein the proxy logic is programmed to recover from the failure, to join the multicast group over a backup interface in order to recover from the failure, and to to remain joined to the multicast group over the primary interface after joining the multicast group over the backup interface and leave the multicast group over the backup interface upon determining that multicast group information is being received over the primary interface.

51. The computer program product of claim 50, wherein the proxy logic is programmed to receive a request for multicast group membership information over the primary interface and send a response to the request for multicast group membership information over the primary interface indicating membership in the multicast group in order to remain joined to the multicast group over the primary interface after joining the multicast group over the backup interface.

52. The computer program product of claim 50, wherein the proxy logic is programmed to monitor for multicast group information received over the primary interface in order to determine that multicast group information is being received over the primary interface.

53. The computer program product of claim 50, wherein the proxy logic is programmed to receive a request for multicast group membership information over the backup interface and send a response to the request for multicast group membership information over the backup interface without an indication of membership in the multicast group in order to leave the multicast group over the backup interface.

54. The computer program product of claim 53, wherein the request for multicast group membership information comprises an IGMP query message, and wherein the response to the request for multicast group membership information comprises an IGMP report message.

55. A multicast communication system comprising a network device coupled to a multicast communication network through a primary interface, wherein the multicast communication network supports a multicast group, and wherein the networking device joins the multicast group over the primary interface and determines that the multicast group failed over the primary interface if no multicast group information is received over the primary interfaced for a predetermined amount of time; wherein the networking device is additionally coupled to the multicast communication network through a backup interface, and wherein the networking device joins the multicast group over the backup interface upon determining that the multicast group failed over the primary interface and continues monitoring for multicast group information received over the primary interface after joining the multicast group over the backup interface and leaves the multicast group over the backup interface if multicast group information is received over the primary interface.

56. The multicast communication system of clam 55, further comprising a multicast host coupled to the networking device over a host interface, wherein the networking device joins the multicast group on behalf of the multicast host.

\* \* \* \* \*